Jan. 15, 1924.   1,480,610

J. HARTEN

GEAR CUTTER

Filed Sept. 30, 1920

Inventor
John Harten
By S. Jay Teller
Attorney

Patented Jan. 15, 1924.

1,480,610

UNITED STATES PATENT OFFICE.

JOHN HARTEN, OF HARTFORD, CONNECTICUT, ASSIGNOR TO PRATT & WHITNEY COMPANY, OF NEW YORK, N. Y., A CORPORATION OF NEW JERSEY.

GEAR CUTTER.

Application filed September 30, 1920. Serial No. 413,877.

*To all whom it may concern:*

Be it known that I, JOHN HARTEN, a citizen of the United States, residing at Hartford, in the county of Hartford and State of Connecticut, have invented certain new and useful Improvements in a Gear Cutter, of which the following is a specification.

This invention relates to metal cutting tools and particularly to a tool of the rack type used in gear generating machines.

It is an object of the invention to form suitably concaved or depressed portions on one surface of a tool of the above type intersecting the cutting edges so that the cutting edges will be given a suitable "rake" or acute angle which will improve their cutting qualities.

A feature of the invention that is advantageous is that the concaved or depressed portion formed on one of the flat surfaces or faces of the cutter adjacent the cutting edge does not destroy the accuracy of the cutting edges of the tool.

Another object of the invention is to form the concaved or depressed portions on one of the surfaces of the tool in directions parallel with the flanks of the rack teeth so that the cutting edges on either side of a tooth and the cutting edges on each tooth are in symmetrical relationship to each other.

Another object is to suitably concave or dress one of the flat surfaces or faces of the cutter with a small grinding wheel, the axis of the wheel being adjusted relative to the surface of the tooth flank so that the intersection of the concaved or depressed portion and the flank of the tooth will form an acute angle.

With these and other objects in view my invention consists in the features of construction and operation set forth in the following specification and illustrated in the accompanying drawing.

In the accompanying drawing annexed hereto and forming a part of this specification, I have shown my invention embodied in a gear cutter of the rack type but it will be understood that the invention can be otherwise embodied and that the drawing is not to be construed as defining or limiting the scope of the invention, the claims appended to this specification being relied upon for that purpose.

Briefly, my invention as a whole comprises a metal cutting tool having along one edge preferably a plurality of rack teeth, the flanks or sides of which are suitably relieved on both sides to form cutting edges, and one of the faces of the cutter provided with concaved or depressed portions adjacent the cutting edges, these concaved or depressed portions providing a suitable "rake" at the cutting edges, thus reducing the angle of the cutting edge and improving the cutting qualities of the tool.

Figure 2:
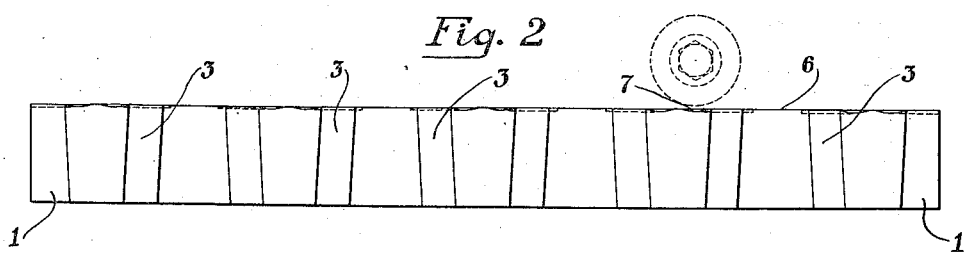
Fig. 2 is a front elevation of the same.

Referring more in detail to the figures of the drawing, at 1 is shown the body portion of a cutter made in accordance with the present invention. This cutter comprises a heavy metal plate of substantially uniform thickness and provided along one of its longitudinal edges with a plurality of rack teeth 2. The lateral surfaces or flanks 3 of the rack teeth 2 at their intersection with one of the faces of the cutter 1 form the cutting edges of the tool. The flanks 3 of the teeth 2, as shown in Fig. 2, are bevelled slightly to provide the necessary relief for the sides of these teeth.

In the particular embodiment of the invention described I have shown a cutter having five teeth, but it is obvious that the number of these teeth may be varied, or, if desired, but one tooth may be formed on the cutter. The upper face 6 of the cutter extending from end to end I provide with concaved or otherwise suitably depressed portions 7. These concaved or depressed portions lie adjacent the intersection of the tooth flanks 3 with the surface 6 so that the portions 7 intersect the flank surfaces 3 at acute angles. The concaved or depressed portions 7, as shown clearly in Fig. 1, extend in directions exactly parallel to the intersection of the surfaces 3 and the top face 6 of the tool so that the intersection of the concaved portions 7 and the flanks 3 is a straight line lying in a plane parallel with the upper surface or face 6 of the cutter.

Figure 1:
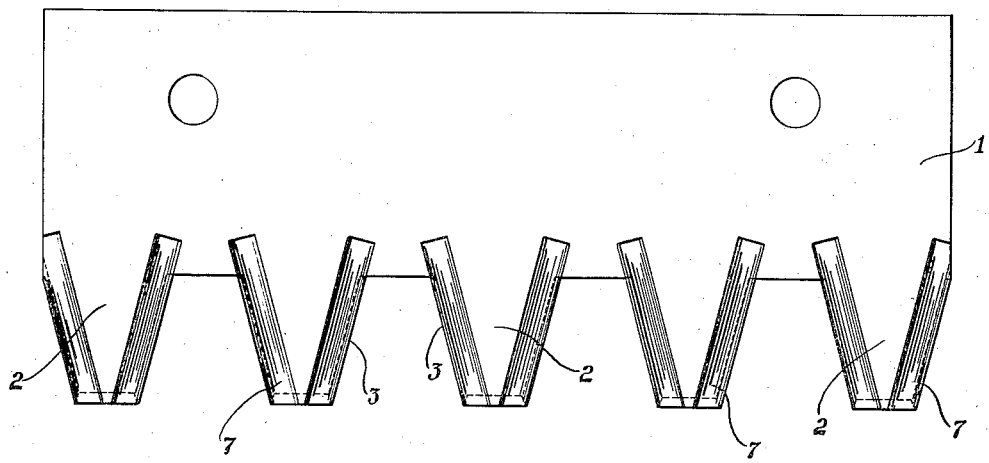
Figure 1 is a plan view of a cutter made in accordance with the present invention.

As shown in Fig. 1, these concaved or depressed portions 7 are provided for the tool flanks on either side of the rack teeth 2 and are preferably symmetrically disposed relative to the upper edge of the tool flanks. In the specific embodiment of the invention illustrated, the axes of the concaved portions are parallel with the flanks of the rack teeth and lie in a plane parallel with the upper surface or face 6 of the cutter so that the symmetry and accuracy of the cutting edges of this cutter are not affected. Also, the axes of the concaved portions 7 lie in planes slightly offset from the surfaces 3 of the flanks so that the concaved portions intersect the surfaces of the flanks at more acute angles than the face 6 and the flanks 3.

It is to be understood that the depressed portions 7 need not be curved as shown but that they may have a flat surface obliquely disposed relative to the face 6.

Figure 3:
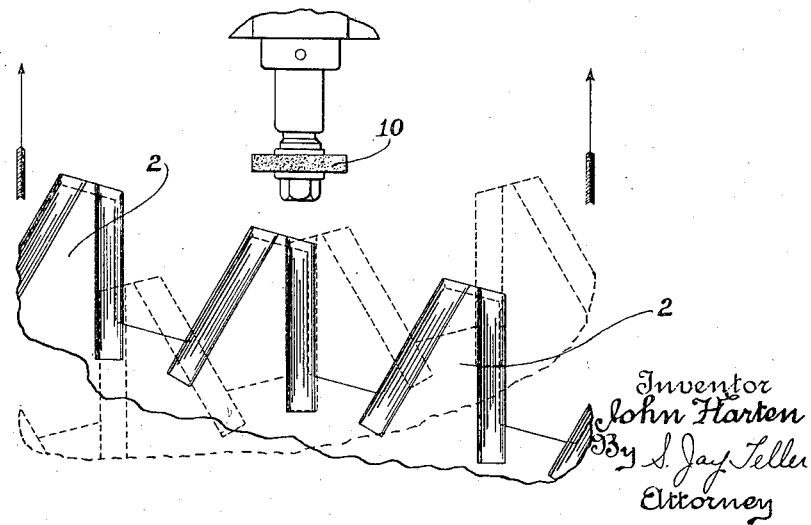
Fig. 3 is a diagrammatic view showing the method of cutting the concave portions.

The tool comprising the present invention may conveniently be made by first suitably forming the rack teeth, the flanks of which may be relieved or bevelled in the usual manner by any convenient means. The cutter may then be positioned directly below a horizontally mounted grinding wheel of small radius and positioned at an oblique angle relative to the axis of the wheel, corresponding with the angle of the flanks 3 of the rack as shown in Fig. 3, and moved, preferably by a suitable guide, directly below the grinding wheel 10 in the direction indicated by the arrows. By elevating the cutter slightly as the bevelling or concaving proceeds the concaved or depressed portions 7 are formed to the proper depth.

Preferably, all of the concaved portions 7 are formed on corresponding sides of each tooth after which the cutter is oscillated to its opposite angular position and again passed below the grinding wheel 10 when the concaved portions on the opposite sides of the teeth will be formed.

What I claim is:

1. A metal cutting tool comprising, a body portion, a rack tooth formed thereon, the intersection of the flanks of said rack tooth and one of the faces of the tool forming cutting edges, said face adjacent said flank having a cut away portion intersecting one of the flanks of the rack tooth whereby the cutting angle of said cutting edge is reduced uniformly throughout its length.

2. A metal cutting tool comprising, a body portion, a rack tooth formed thereon, the intersection of the flanks of said rack tooth and one of the faces of the tool forming cutting edges, said face having depressed portions extending parallel to the flanks and intersecting the flanks of the rack tooth so as to decrease the angle of the cutting edge whereby the cutting edges of the tool are provided with a rake to improve its cutting qualities.

3. A metal cutting tool comprising, a body portion, a rack tooth, the intersection of the flanks of said rack tooth with one of the faces of said tool forming cutting edges, said face having a concaved portion adjacent one of the flanks of said rack tooth, the axis of said concaved portion lying respectively parallel with the flank of said tooth.

4. A metal cutting tool comprising, a body portion, a rack tooth, the intersection of the flanks of said rack tooth with one of the faces of said tool forming cutting edges, said face having concaved portions adjacent the flanks of said rack tooth, to decrease the angle of the cutting edges, the axes of said concaved portions lying respectively parallel with the flanks of said tooth.

5. A cutter for a gear generating machine comprising, a body portion having a plurality of rack teeth, one of the faces of said cutter having concaved portions extending respectively in directions parallel with the flanks of said rack teeth, the axes of said concaved portions being parallel to the cutting edges of said cutter and said concaved portions also intersecting said flanks at acute angles.

6. A cutter for a gear generating machine comprising, a body portion having a plurality of rack teeth, one of the faces of said cutter having depressed portions extending respectively in directions parallel with the flanks of the rack teeth, the direction of said depressed portions being parallel respectively to the cutting edges of said cutter whereby the depressed portions intersect the flanks of the teeth at acute angles.

7. A cutter for a gear generating machine comprising, a body portion having a plurality of rack teeth, one of the faces of said cutter having concaved portions extending respectively in directions parallel with the flanks of said rack teeth, the axes of said concaved portions being parallel to the cutting edges of said cutter and said concaved portions also intersecting said flanks on lines parallel with said face.

In testimony whereof, I hereto affix my signature.

JOHN HARTEN.